United States Patent [19]
Kondo

[11] 3,728,951
[45] Apr. 24, 1973

[54] DEVICE FOR ILLUMINATING INDICIA IN THE VIEWFINDER OF A CAMERA

[75] Inventor: Hidenobu Kondo, Kawasaki, Japan

[73] Assignee: Nippon Kogaku K.K., Tokyo, Japan

[22] Filed: Mar. 23, 1971

[21] Appl. No.: 127,290

[30] Foreign Application Priority Data

Ap. 7, 1970   Japan..............................45/32838

[52] U.S. Cl.........................95/42, 95/11 V, 240/2 C
[51] Int. Cl.............................................G03b 19/12
[58] Field of Search......................95/11 V, 42, 44 R, 95/44 C, 10 C; 240/2 C, 2.1

[56] References Cited

UNITED STATES PATENTS

| 2,298,403 | 10/1942 | Mihalyi | 240/2 C X |
| 2,642,790 | 6/1953 | Scholkemeir | 240/2 C X |
| 3,106,141 | 10/1963 | Estes | 95/10 C |

FOREIGN PATENTS OR APPLICATIONS

| 1,930,007 | 1/1970 | Germany | 95/11 V |

*Primary Examiner*—Samuel S. Matthews
*Assistant Examiner*—F. M. Bero
*Attorney*—Ward, McElhannon, Brooks & Fitzpatrick

[57] ABSTRACT

In a single lens reflex camera having a pre-set diaphragm, means is provided for illuminating the indicia found on the viewfinder. The illuminating means includes a light source, and a set of switches associated with a manually operable member so as to activate and deactivate the light source in response to the operation of the operable member.

4 Claims, 1 Drawing Figure

PATENTED APR 24 1973 3,728,951
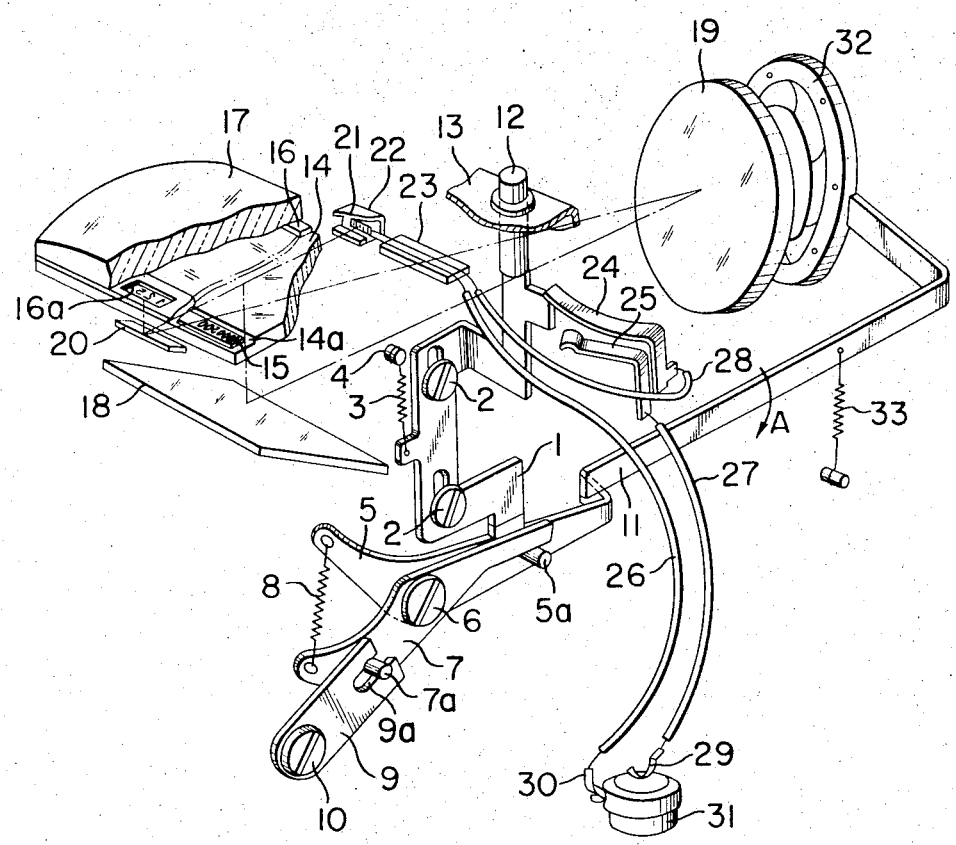

DEVICE FOR ILLUMINATING INDICIA IN THE VIEWFINDER OF A CAMERA

BACKGROUND OF THE INVENTION

1. Field of the Invention

This invention relates to cameras such as single lens reflex cameras, and more particularly to the provision in such cameras of display means for indicia such as numerical values, i.e., shutter speeds and $f$-numbers, in the viewfinder. The present concept includes means for illuminating such indicia to enable them clearly to be viewed in the viewfinder of such cameras.

2. Description of the Prior Art

A number of modern single lens reflex cameras have various numerical indicia such as shutter speeds and $f$-numbers displayed in their viewfinders; and these cameras usually utilize part of the light entering through an objective lens to illuminate the indicia. However, such arrangements suffer the disadvantage that when it is necessary to effect photometry with a stopped down lens aperture (hereinafter referred to as "stopped-down photometry"), it is difficult clearly to see the indicia, particularly in a dark environment.

SUMMARY OF THE INVENTION

In view of the foregoing, I contribute by my invention apparatus which overcomes the foregoing difficulty and disadvantage. Thus, I provide means for illuminating indicia such as numerical shutter speed and $f$-stop values in the viewfinder of a single lens reflex camera. The means contemplated include a light source disposed adjacent indicia display means and adapted to be actuated in response to operation of a stop-down mechanism, thus to illuminate the indicia when the lens aperture is stopped down.

DESCRIPTION OF THE DRAWING

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chose for purposes of illustration and description, and is shown in the accompanying drawings, forming a part of the specification wherein:

The single FIGURE is a perspective view illustrating the stop mechanism and viewfinder of a camera embodying the present invention.

DESCRIPTION OF THE PREFERRED EMBODIMENT

Referring to the drawing, a stop-down lever 1 is mounted for vertical sliding movement by means of guide screws 2 secured to the body of a camera and passing through guide slots formed in the lever 1. As shown, the stop-down lever 1 is normally biased upwardly by a spring 3 having one end thereof connected to the lever 1 and the other end secured to a pin 4 studded in the camera body. A diaphragm opening lever 5 is pivotally mounted on a screw 6 secured to the camera body, and a diaphragm actuating lever 7 is also pivotally mounted on the same screw 6. The levers 5 and 7 are connected together at one end by a spring 8 so that the diaphragm actuating lever 7 is normally biased in a direction whereby the other end thereof engages a pin 5a formed in the diaphragm opening lever 5. A release lever 9 is pivotally mounted at one end thereof by means of a screw 10 secured to the camera body, and this lever 9 is adapted to rotate counter-clockwise (as viewed) in response to a shutter release action. The other end of the release lever 9 has a recess 9a formed to engage a pin 7a studded in the diaphragm actuating lever 7. Normally, that is, before a shutter release, the release lever 9 maintains the diaphragm opening lever 5 and the diaphragm actuating lever 7 in their respective positions, as shown, where the end of the diaphragm opening lever 5 which is remote from the spring 8 abuts a lever 11 connected to an automatic pre-set diaphragm 32, thereby maintaining the diaphragm 32 in fully open position. A force is applied to the lever 11 of the diaphragm to rotate same in the direction of arrow A (about the optic axis) by a conventional spring 33 provided within the lens barrel (not shown), so that rotation of the lever 11 in the direction of arrow A causes the diaphragm to be stopped down to a pre-set $f$-value. Therefore when the release lever 9 is rotated in the counter clockwise direction in response to the shutter release, the pre-set diaphragm 32 is stopped down to the pre-set $f$-value.

A stop-down button 12 has one end thereof projected outwardly of a camera body 13, and is so arranged that when depressed it causes the stop-down lever 1 to move downwardly thereby to rotate the diaphragm opening lever 5 in the clockwise direction against the force of the spring 8, while the diaphragm actuating lever 7 is retained by the release lever 9. A focusing screen 14 is formed with a groove 14a for receiving therein a transparent plate 15 having a shutter speed scale thereon. The scale plate 15 is of known type and movable in either direction in the groove 14a in response to rotation of a shutter speed setting dial or ring (not shown) so as to indicate shutter speed values of the plate through a window 16a formed in a viewfinder frame 16 provided between a condenser lens 17 and the focusing screen 14.

A mirror 18 is so arranged to rock between a viewing position and a photographing position. A smaller mirror 20 is disposed above and outwardly of the mirror 18 for upwardly reflecting part of the light passing through an objective lens 19 so as to illuminate the shutter speed values of the scale plate 15 appearing in the window 16a. A tiny lamp 21 is provided also to illuminate the values in the window 16a via the smaller mirror 20. The lamp 21 is provided with a reflector plate 22 held by a insulating plate 23. A switch contact 24 formed of a resilient material is adapted to be urged into contact with a second switch contact 25, and has one end engaging a projection of the stop-down lever 1, as shown. Thus, in the normal or undepressed position of the lever 1, the end of the switch contact 24 is resiliently raised by that lever so that the two switch contacts 24 and 25 are disengaged from each other. Lead wires 26 and 28 are led from the lamp 21 and extend through the printed plate 23 to a cell 31 and the switch contact 24, respectively, whereas a wire lead 27 extends from the cell 31 to the switch contact 25. The lead wires 27 and 26 are connected with the cell 31 by means of respective contacts 29 and 30. Thus, an electric circuit is established for energization of the lamp 21 when the switch contacts 24, 25 are closed.

In operation, when the stop-down button 12 is depressed to effect the stop-down photometry, the stop-down lever 1 is moved downwardly against the force of the spring 3 thereby to rotate the diaphragm opening lever 5 clockwise against the force of the spring 8. As a result, the diaphragm opening lever 5 is disengaged from the lever 11 to allow the lever 11 to rotate in the direction of arrow A so that the pre-set diaphragm 32 is stopped down to a pre-set $f$-value. At the same time, the downward movement of the stop-down lever 1 also allows the switch contact 24 which has been raised by the lever 1 to return to its unbiased position from its own resiliency, so that the contact 24 is engaged with the contact 25 thereby to energize the lamp 21 for illumination of the values in the window 16a.

It will be appreciated by those skilled in the art that stopping down the diaphragm 32 reduces the amount of light passing the objective lens 19 thus to darken the window 16a. However, in accordance with the present invention, the values of the scale plate 15 can clearly be seen with the aid of the light emitted from the lamp 21 to the window 16a. When the stop-down button 12 is released, all the parts return to their normal positions as shown and the lamp 21 is deenergized.

From the foregoing description it will be seen that according to the present invention, when stop-down photometry is effected, the lamp 21 is turned on in response to the stop-down or depressed operation of the lever 1 to illuminate the indicia appearing in the viewfinder and to ensure that such indicia may be read clearly and without the difficulty which would otherwise be encountered due to the darkened viewfinder as the result of the stop-down. Moreover, the switch contact 24 never fails to assume the open or "OFF" position with respect to the switch contact 25 in response to the release of the stop-down operation and this is highly useful to prevent any unnecessary power consumption of the cell.

I claim:

1. In a single lens reflex camera having an automatic diaphragm, the combination comprising:
   a viewfinder;
   a scale device disposed in said view finder, said scale device being observed through said viewfinder and illuminated with part of the light passing through the objective lens;
   a manually operable member connected to said automatic preset diaphragm for stopping down the diaphragm to a preset $f$-value during operation of said manually operable member;
   electrically illuminating means associated with said manually operable member to illuminate said scale device during operation of said manually operable member;
   wherein said electrically illuminating means includes a circuit having a lamp, a source of electric potential, a pair of switch members and connections for connecting the lamp and said switch members to said source, said switch members being associated with said manually operable member for closing the circuit to turn on said lamp during operation of said manually operable member and opening the circuit to turn off the lamp while the operable member is inoperative.

2. A single lens reflex camera according to claim 1 which additionally comprises a reflecting mirror which directs part of the light passing through said objective lens and from the light source to said scale.

3. The combination according to claim 1, wherein said scale device has $f$-values and shutter speed values.

4. The combination according to claim 1, wherein said viewfinder includes a focusing screen, and the scale device is disposed on said focusing screen.

* * * * *